O. HERMOYE AND C. GLORIAN.
HOLLOW BODY FROM CONCRETE AND ITS APPLICATION FOR CONCRETE CONSTRUCTIONS.
APPLICATION FILED MAY 2, 1919.
1,412,113.
Patented Apr. 11, 1922.
2 SHEETS—SHEET 1.
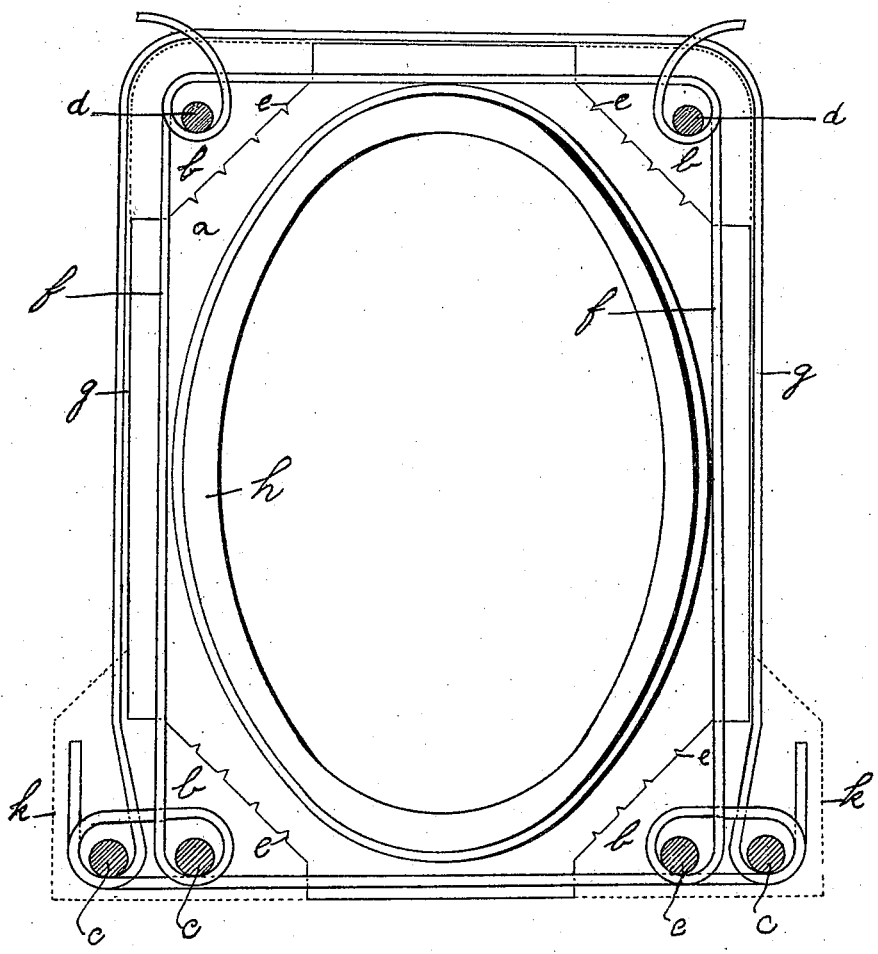
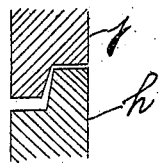
INVENTORS:
O. HERMOYE and C. GLORIAN
BY John O. Seifert
Attorney

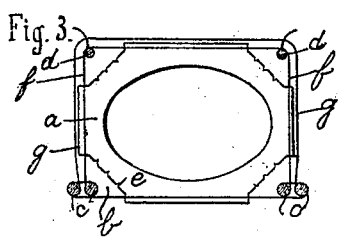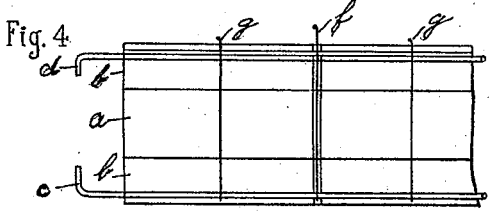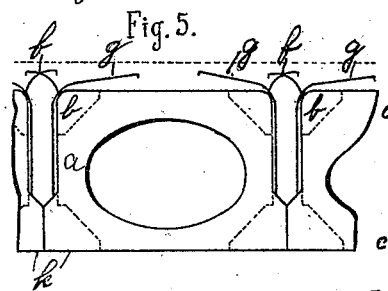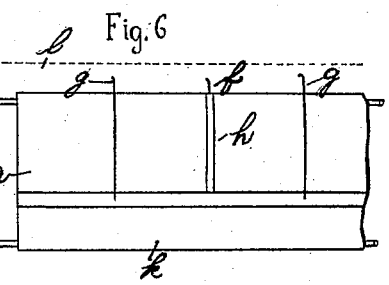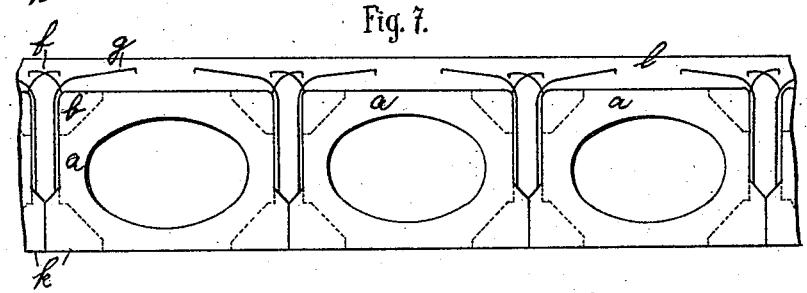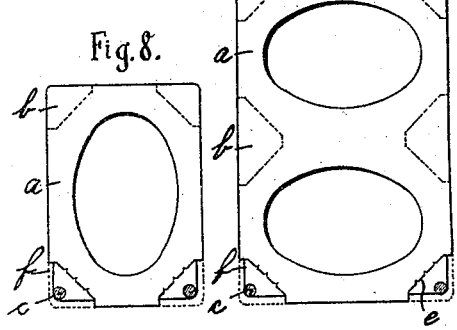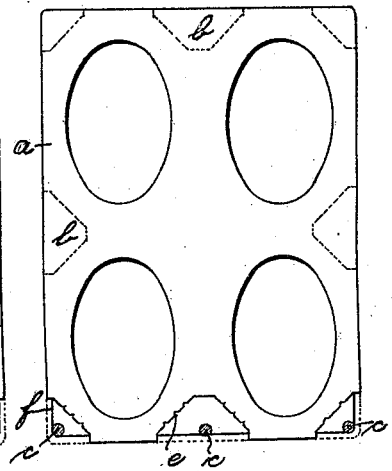

UNITED STATES PATENT OFFICE.

OSCAR HERMOYE AND CHARLES GLORIAN, OF BRUSSELS, BELGIUM.

HOLLOW BODY FROM CONCRETE AND ITS APPLICATION FOR CONCRETE CONSTRUCTIONS.

1,412,113.     Specification of Letters Patent.     Patented Apr. 11, 1922.

Application filed May 2, 1919. Serial No. 294,344.

*To all whom it may concern:*

Be it known that we, OSCAR HERMOYE, builder, and CHARLES GLORIAN, engineer, the first a subject of the King of Belgium, the second a citizen of the French Republic, residing at Brussels, Belgium, have invented new and useful Improvements in a Hollow Body from Concrete and its Application for Concrete Constructions, of which the following is a specification.

This invention relates to structural units or blocks, and it is the object of the invention to provide an improved structural unit or hollow body formed of poured or pressed concrete or the like, and to the application of such unit or block in a continuous, homogeneous one piece structure of reinforced concrete, as in the construction of platforms, floors, partitions, the shells of ships, underground chambers and the like, as well as for use in the construction of hollow columns, pillars and the like.

It is a further object of the invention to provide a hollow block of this character having an opening therethrough from end to end the interior wall of which is of circular or elliptical form, or having an intrados outline, having two symmetrical weight bearing or pressure resisting lines extending through opposite sides of the block and at right angles to each other whereby whatever the position of the block may be, the pressure applied in a direction of either of said pressure resisting lines will be transmitted into lateral thrust without straining to the inequalities of pressure.

It is another object of the invention to provide a block for this purpose the exterior surface of which is arranged to form engaging surfaces for adjacent blocks and with cavities or recesses for the reception of reinforcing means and concrete or grouting to assemble and connect the blocks into a continuous and integral one piece structure.

It is a further object of the invention to provide a block in which the ends of the block are provided with a projecting portion extending around the wall of the opening and arranged to break joints with similar projections of adjacent blocks.

In the drawings accompanying and forming a part of this specification, Figure 1 is a front elevation of a hollow body or block illustrating an embodiment of the invention.

Figure 2 is a sectional detail view to show the mating connection of adjacent blocks, Figure 3 is an elevation on a reduced scale showing the arrangement of the reinforcing means.

Figure 4 is a side elevation of a pair of blocks assembled end to end.

Figure 5 is an end elevation showing the manner of connecting the blocks in an integral structure.

Figure 6 is a side elevation showing a pair of blocks in end to end relation and the manner of forming them into an integral structure by grouting.

Figure 7 is an end elevational view showing the manner of constructing a flooring or partition; and Figures 8, 9 and 10 are end elevational views showing modified structures of units built up from the blocks.

In the embodiment of the invention shown in Figures 1 to 7 of the drawings the blocks $a$ are made of poured or pressed concrete, the composition of which may vary in accordance with the degree of resistance required, these blocks being preferably of rectangular shape of greater width than thickness and of varying lengths as desired. The blocks are formed with an opening or hollow extending longitudinally therethrough the wall of which is circular and preferably of elliptical form or shape to provide an opening the wall of which has an intrados outline so that the block has two symmetrical weight bearing or pressure resisting lines, one being substantially through the thickness of the block from opposite sides and the other through the width thereof from opposite sides, and which lines of force are arranged substantially at right angles to each other. By this arrangement of the wall of the opening through the block no matter what the position of the block may be pressure applied to the block in a direction of either of said pressure resistance lines such pressure will be transmitted into lateral thrust without straining of the material of the block due to inequalities of the pressure. The opposite ends of the blocks are arranged with a projecting portion to extend around the wall of the opening, the ends of which are of angular shape whereby one of said projections will break joints and have mating connection with a similar projecting portion on an adjacent block, as shown at $j$, $h$ in Figure 2, and provide a space for the flow of grouting, such as cement or concrete, and the reception of reinforcing means for a purpose to be hereinafter set forth. These projecting portions also serve as reinforcing members.

The blocks are substantially of rectangular shape in cross section with the corners cut away, as at $b$, to provide a wall the greater portion of which extends diagonally to the sides of the block with the extremities extending at right angles to the sides of the blocks, the diagonally extending portion of which is recessed or grooved as at $e$.

Longitudinal tension and compression reinforcing rods $c$ and $d$ are adapted to engage in the cavities formed by the cut away portions $b$, which longitudinal rods are connected by transverse binding rods $f$ which are embedded in the material of the portions of the block between the cut away portions $b$ and to engage in such latter portions where they are looped for the engagement of the rods $c$ and $d$; and binding rods $g$ to engage around the outer surface of the block in alternate relation to the rods $f$, as shown in Figures 4 and 6, and are not embedded in the material of the block. The recessed portions or cavities $b$ are then filled with concrete or cement, this material in the upper cavities being levelled off with the surface of the block, while the material in the lower cavities $b$ is arranged to form projections $k$. By this arrangement it will be noted that the longitudinal and transverse reinforcing and binding rods are embedded in such material in the cavities $b$ with the exception of the binding member $d$ at the top of the block, and which member or rod at the top is severed and separated. The blocks in this condition are ready for assembling in position for the construction of a flooring, partition or the like, and are assembled in juxtaposed relation, as shown in Figures 5, 6 and 7, the projections $k$ abutting against each other thereby forming spaces between adjacent blocks, as clearly shown in Figures 5 and 7 for the reception of a filling of solid concrete, said concrete being also spread over the top of the blocks, as shown at 1 in Figures 6 and 7. The recesses or grooves $e$ in the angular portions of the cavities $b$ provide a firm seating for the concrete. The ribbed filling between the blocks of the surfacing material increases the surface of adhesion between the blocks, and staples may be provided in such spaces to co-operate with the tension rods to take up the shearing strain on the rods and vertical walls of the block, and by this arrangement the flooring or partition instead of being formed of independent elements functioning separately the surfacing material run into the spaces between the blocks constitutes an integral one piece block completely incasing the hollow blocks and uniting the latter in a continuous, homogeneous structure.

By this arrangement of blocks and of assembling the same in a floor or partition structure the formation of the wall of the openings in the blocks serves as an arch the crown of which is centrally of the respective blocks with the springings located in the material of the block substantially in a plane centrally through the block, and which also constitutes the span of the arch, with the weight bearing or pressure resisting lines of force coming upon the crown of the arch so formed and will be transmitted into lateral thrust taken up in the springings of the arch which in all instances will be located in a plane extending substantially centrally through the block in all positions of the block.

The blocks as shown in Figure 8 may be built up into standard units of two or more blocks, and in Figure 9 there is shown such a unit built up of a pair of hollow bodies, while in Figure 10 a unit is shown formed of four hollow bodies.

Having thus described our invention, we claim:

1. A block of the character described comprising a rectangular structure having an opening therethrough the wall of which opening is of elliptical form and with the corners of the block cut away longitudinally thereof on diagonal lines relative to the sides of the block, transverse binding rods embedded in the material of the block, and longitudinal reinforcing rods to engage and looped around the transverse rods in said cut away portion for the purpose specified.

2. A block of the character described comprising a rectangular structure having an opening therethrough the wall of which opening is of elliptical form and with the corners of the block cut away on diagonal lines relative to the sides of the block for the engagement of longitudinal tension rods, and transverse binding rods embedded in the material of the block and adapted to have connection with the longitudinal tension rods for the purpose specified.

3. A reinforced concrete structure comprising blocks having openings therethrough the wall of which openings is in the form of an ellipse and arranged with reinforcing means extending longitudinally and transversely around the same, blocks having the corners cut away on lines diagonal to the sides to expose the reinforcing means and for the engagement of means to provide spaces between adjacent blocks when assembled in juxtaposed relation, and grouting to fill said spaces with the reinforcing means in imbedded relation therewith and spread over the surface of the assembled blocks for the purpose specified.

4. In a reinforced concrete structure rectangular blocks having an opening therethrough the wall of which opening forms an intrados outline in any position the block may be supported upon a side thereof and with the corners of the block cut away on lines diagonally to the sides, reinforcing members extending longitudinally in said cut away portions, transverse reinforcing members connected to the longitudinal reinforcing members within the cut away portions, grouting filling said cut away portions with the reinforcing members embedded therein and arranged to space the blocks when assembled in juxtaposed relation, and grouting to fill the spaces between the blocks and spread over the surface of the assembled blocks for the purpose specified.

5. In a reinforced concrete structure rectangular blocks of poured or pressed concrete with the corners cut away on lines diagonally to the sides of the block and having an opening extending longitudinally therewith with the wall of the opening of elliptical form, and said blocks having a portion extending around the wall of the opening projecting from opposite ends of the blocks to form mating relation with a similar projection on blocks assembled in endwise relation and serving to space the blocks apart; reinforcing rods extending longitudinally in the diagonally cut away portions of the blocks and transversely around the blocks and connected to the longitudinal rods with said rods severed and the ends projecting from a face of the blocks; grouting to embed the connected reinforcing rods in the diagonally cut away portions and arranged to maintain the blocks spaced when assembled in sidewise relation; and grouting to fill the spaces between the blocks and spread over a face of the blocks to unite the blocks in a continuous integral structure with said grouting.

In testimony whereof we have signed our names to this specification in the presence of two subscribing witnesses.

OSCAR HERMOYE.
CHARLES GLORIAN.

Witnesses:
A. J. BORQUAND,
F. BAEVEL.